United States Patent
Hughes et al.

(10) Patent No.: US 10,366,406 B2
(45) Date of Patent: Jul. 30, 2019

(54) ESTIMATING THE REACH PERFORMANCE OF AN ADVERTISING CAMPAIGN

(71) Applicant: Facebook, Inc., Menlo Park, CA (US)

(72) Inventors: Charles Joseph Hughes, San Francisco, CA (US); Xiao Zhang, Mountain View, CA (US); Patrick Brendan Maginnis, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 1160 days.

(21) Appl. No.: 14/563,858

(22) Filed: Dec. 8, 2014

(65) Prior Publication Data

US 2016/0162932 A1 Jun. 9, 2016

(51) Int. Cl.
*G06Q 30/02* (2012.01)
*H04L 29/08* (2006.01)

(52) U.S. Cl.
CPC ..... *G06Q 30/0246* (2013.01); *G06Q 30/0205* (2013.01); *H04L 67/02* (2013.01); *H04L 67/125* (2013.01); *H04L 67/18* (2013.01); *H04L 67/20* (2013.01); *H04L 67/22* (2013.01); *H04L 67/306* (2013.01)

(58) Field of Classification Search
CPC .................................. G06Q 30/0207-0277
USPC .............................................. 705/14.1-14.73
See application file for complete search history.

(56) References Cited

U.S. PATENT DOCUMENTS

| | | | | |
|---|---|---|---|---|
| 2011/0320259 | A1* | 12/2011 | Roumeliotis | G06O 30/02 705/14.41 |
| 2012/0179549 | A1* | 7/2012 | Sigmund | G06Q 30/0261 705/14.58 |
| 2013/0226666 | A1* | 8/2013 | Terrazas | G06Q 30/0205 705/7.34 |
| 2015/0120455 | A1* | 4/2015 | McDevitt | G06Q 30/0261 705/14.58 |

* cited by examiner

*Primary Examiner* — Sam Refai
(74) *Attorney, Agent, or Firm* — Fenwick & West LLP

(57) ABSTRACT

A social networking system receives information describing locations associated with a plurality of its users. Based on information identifying each user and a location associated with each user, the social networking system generates and stores hash values. For example, the social networking system maintains various geo-tiles that each identify geographic areas and generates a hash value based on a user identifier and an identifier of a geo-tile including the location associated with the user. Based on the hash values and locations associated with one or more users, the online system determines a number of unique users associated with locations included in a geographic region. When determining the number of unique users, the online system accounts for a rate at which the online system updates location information associated with various users.

15 Claims, 7 Drawing Sheets

| Time Stamp | Geo-Tile ID | User ID |
|---|---|---|
| 9/2/2014 | 12345678 | user1 |
| 9/2/2014 | 12345679 | user2 |
| 9/2/2014 | 12345678 | user3 |
| 9/3/2014 | 12345688 | user4 |
| 9/3/2014 | 12345678 | user5 |
| 9/4/2014 | 12345678 | user6 |
| 9/5/2014 | 12345679 | user7 |
| 9/5/2014 | 12345677 | user8 |
| 9/5/2014 | 12345688 | user9 |
| 9/5/2014 | 12345678 | user10 |

| | Time Stamp 501 | Geo-Tile ID 503 | Hash 505 |
|---|---|---|---|
| 510A | 9/2/2014 | 12345678 | SHA256(12345678\|user1) = c50805b1aefa607a22a82fc6ae880312736b018d9ef25f2a8b2450cd733908bb |
| 510B | 9/2/2014 | 1234567 | SHA256(1234567\|user1) = 29bd48296b21c7fe38e8d3c4217eaab8205cc95504f779b1a7c310f2fd7ad876 |
| 510C | 9/2/2014 | 123456 | SHA256(123456\|user1) = 0b7aa848d920b53d046805e51ae3bd158d1ace23dcf436327dccbe459ddb4084 |
| 510D | 9/2/2014 | 12345 | SHA256(12345\|user1) = 0d9fcf739a08edffa5b6399bdc46002c7a2744c5fb38caa600d82b8e9efa062f |
| 520A | 9/2/2014 | 12345679 | SHA256(12345679\|user2) = 976c24b5bcbce167d4f504fecda8dae5147e831a2cb1c7c01918a7cf334e3d30 |
| 520B | 9/2/2014 | 1234567 | SHA256(1234567\|user2) = a791cd7e942c1752c93ea1b674ef0adf8bad42bf88a37877a0632a1e913686 |
| 520C | 9/2/2014 | 123456 | SHA256(123456\|user2) = e66240c0537b0cb80de67ad6eb3f57cabfad770b12e9b2d0155b6cf0387a1b6c |
| 520D | 9/2/2014 | 12345 | SHA256(12345\|user2) = edcf0888cffb3ead11504309c5d3f2c62f646bd5767c533e8e529348f8d41b45 |
| 530A | 9/3/2014 | 12345688 | SHA256(12345688\|user1) = a082fc1088c8465bfc92719dcbe030b4c114196cc9700423bae74d576416ca16 |
| 530B | 9/3/2014 | 1234568 | SHA256(1234568\|user1) = 9a6f35aea2cfef78a1c11d14c3623c660093116bcd0a993168eede14b1fa1c0 |
| 530C | 9/3/2014 | 123456 | SHA256(123456\|user1) = 0b7aa848d920b53d046805e51ae3bd158d1ace23dcf436327dccbe459ddb4084 |
| 530D | 9/3/2014 | 12345 | SHA256(12345\|user1) = 0d9fcf739a08edffa5b6399bdc46002c7a2744c5fb38caa600d82b8e9efa062f |

FIG. 5

ESTIMATING THE REACH PERFORMANCE OF AN ADVERTISING CAMPAIGN

BACKGROUND

This disclosure relates generally to online advertising, and more specifically to estimating a number of users an online advertisement may reach.

Advertisers may have certain goals when planning a new advertising campaign ("advertising campaign"). For instance, an advertiser may have a goal for the number of times an advertisement is presented to users of an online system (i.e., the number of "impressions" of the advertisement), the number of different online system users presented with an advertisement (i.e., the "reach" of the advertisement), and/or a duration during which the advertisement is presented. Conventionally, an advertiser specifies certain attributes of an advertising campaign or advertisements in an advertising campaign when specifying the advertising campaign. For example, an advertiser identifies targeting criteria associated with one or more advertisements in an advertising campaign.

However, advertisers may lack information to accurately identify how to achieve one or more goals of an advertising campaign. For instance, an advertiser may have a desired reach for an advertisement campaign, but lack information for determining a geographic area in which the advertisement is presented that would achieve the desired reach. Alternatively, an advertiser may specify a geographic area in which an advertisement is presented, but lack information for determining a reach of the advertisement within the specified geographic area.

SUMMARY

A social networking system determines an estimated number of distinct users capable of being presented with an advertisement within a geographic location. The social networking system maintains information associating a location with various users, and also maintains various geo-tiles that each correspond to a geographic area. Based on the locations associated with users, the social networking system determines a number of distinct users included in geo-tiles included in a geographic region associated with an advertisement to estimate a number of distinct users eligible to be presented with the advertisement.

Because of privacy concerns with storing a location history of a user, the social networking system associates a user with a single location, rather than a history of prior locations. However, the social networking system stores cryptographic hash values generated based on information identifying a user and information identifying a geo-tile including a location associated with the user, while the cryptographic hash value does not allow the social networking system to subsequently identify the user, it allows the social networking system to identify a number of users associated with a location included in a geo-tile. An association between the cryptographic hash value and the geo-tile used to generate the cryptographic hash value is stored by the social networking system along with the cryptographic hash value. To generate the cryptographic hash value, a cryptographic hash function that does not allow the social networking system to determine information identifying the user from the cryptographic hash value is used. Using the cryptographic hash values, a number of distinct users associated with locations within a specific geo-tile is determined.

Based on a number of users associated with locations included in a geo-tile and the determined number of distinct users associated with locations included in the geo-tile, a sampling rate for the geo-tile is determined. Based on the sampling rates for each geo-tile included in a geographic region, an average sampling rate is determined. Using the average sampling rate and the number of users associated with a location inside the geographic region, an estimated number of distinct users associated with locations inside the geographic region is determined.

BRIEF DESCRIPTION OF THE DRAWINGS

FIG. 5 illustrates values associated with geo-tiles by the social networking system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
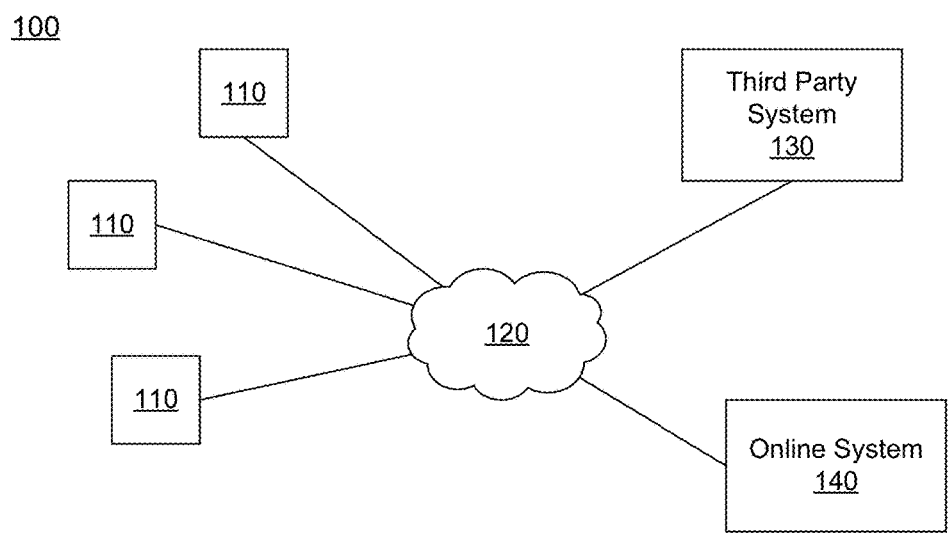
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to a client device 110 for use by an application executing on the client device 110. In other embodiments, a third party system 130 provides content or other information for presentation via a client device 110. A third party system 130 may also communicate information to the social networking system 140, such as advertisements, content, or information about an application provided by the third party system 130.

Figure 2:
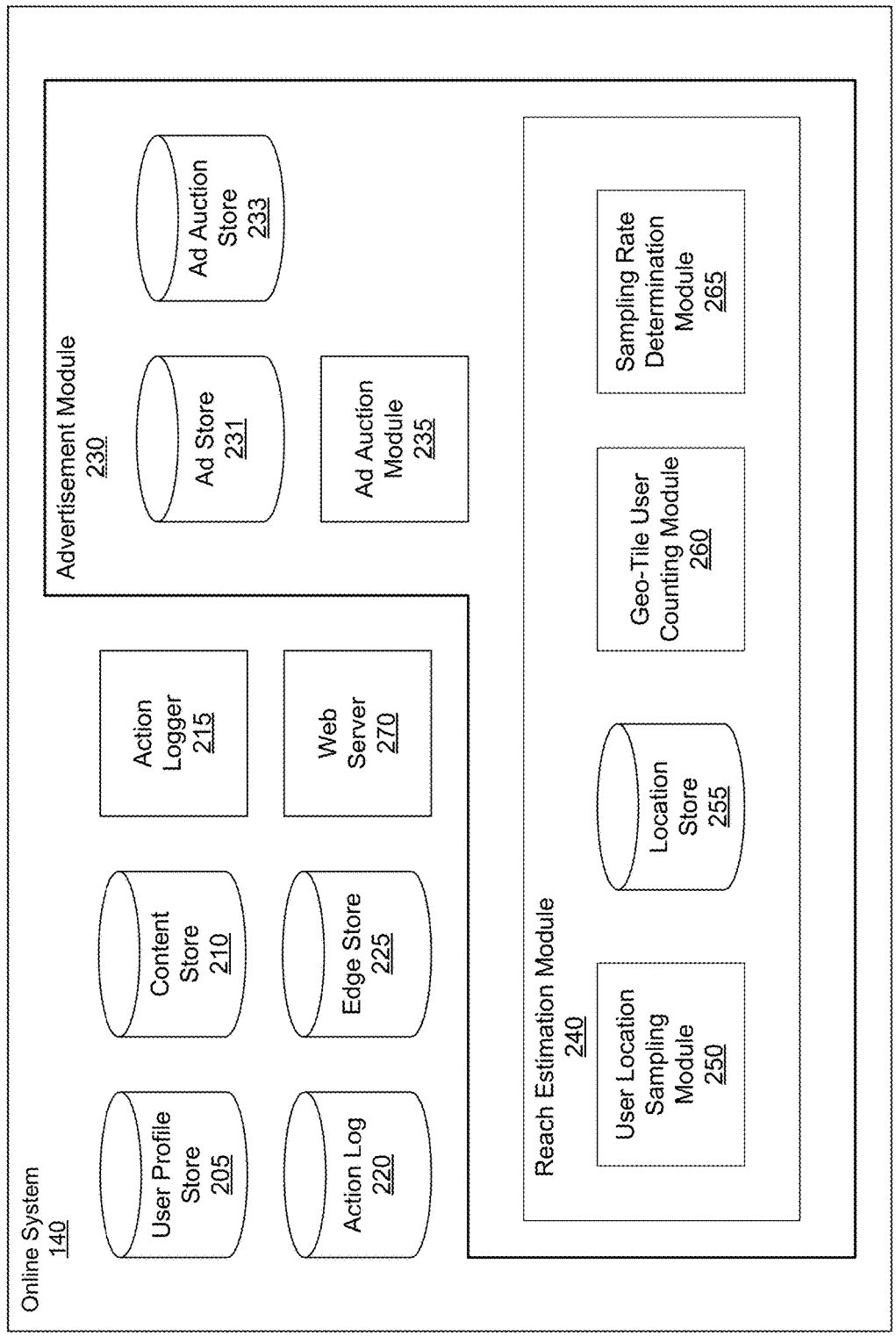
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, the advertisement module 230, and a web server 270. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, a topic, or another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The advertisement ("ad") module 230 includes an advertisement ("ad") store 231, an ad auction store 233, an ad auction module 235, and a reach estimation module 240. The ad module 230 stores information describing advertisement ("ad") campaigns received from one or more advertisers. Each advertising campaign includes one or more advertisements described by ad requests, with information describing an advertising campaign and its constituent advertisements included in the ad store 231.

An advertising campaign may be associated with one or more objectives, a duration, and a budget. An objective associated with an advertising campaign describes one or more goals for actions associated with the advertising campaign. For example, an objective specifies a total number of impressions of advertisements in the advertising campaign to social networking system users (an "impression objective"), specifies a total number of unique social networking system users to be presented with at least one advertisement from the advertising campaign (a "reach objective"), specifies a number of times an advertisement from the advertising campaign is presented to a social networking system user (a "frequency objective"), or specifies any other suitable criteria. The budget specifies a total amount of compensation an advertiser associated with an advertising campaign provides the social networking system 140 for presenting advertisements in the advertising campaign or for the social networking system 140 receiving interactions with advertisements in the advertising campaign. Additionally, the duration associated with the advertising campaign specifies a time interval during which advertisements from the advertising campaign are presented to social networking system users. For example, if the duration of an advertising campaign is 30 days, advertisements included in the advertising campaign are presented to social networking system users for 30 days after the advertising campaign is provided to the social networking system 140. In some embodiments, the advertiser may also specify a start date for the advertising campaign, so the duration is measured from the specified start date.

An advertising campaign includes one or more ad requests that each describe advertisements in the advertising campaign for presentation to one or more social networking system users. An ad request includes advertisement content (also referred to as an "advertisement"), which is text, image, audio, video, or any other suitable data presented to a user. In various embodiments, the advertisement content is associated with a network address specifying a landing page, or other destination, to which a user is directed when the advertisement is accessed. An ad request also associates a bid amount with an advertisement. In some embodiments, the bid amount is specified by an advertiser and is used to determine an expected value, such as monetary compensation provided by an advertiser, to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Alternatively, the advertiser does not associate a bid amount with the ad request, but specifies a budget, a duration and/or one or more objectives with an advertising campaign including the ad request. Based on the budget or one or more objectives associated with the advertising campaign including the ad request and based on previously completed auctions selecting advertisements for a user the social networking system 140 determines a bid amount associated with the ad request. For example, based on a reach objective of an advertising campaign, the social networking system 140 analyzes previously completed advertisement auctions selecting an advertisement using different potential bid amounts to identify a bid amount for advertisements in the advertising campaign to accomplish the reach objective.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users. Additionally, targeting criteria may be associated with an advertising campaign in its entirety, so multiple advertisements in the advertising campaign are eligible for presentation to users having characteristics satisfying one or more of the targeting criteria associated with the advertising campaign.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action (e.g., sending a message to another user, using an application, joining a group, leaving a group, joining an event, generating an event description, purchasing or reviewing a product or service using an online marketplace, requesting information from a third-party system 130, or any other suitable action). Including actions in targeting criteria allows advertisers to further refine users eligible to be presented with advertisement content from an advertisement request. As another example, targeting criteria identifies users having a connection to another user or object or having a particular type of connection to another user or object.

Targeting criteria may also specify a location associated with users eligible to be presented with advertisement content in an advertisement request. For instance, a targeting criteria specifies that advertisement content included in an advertisement request is eligible for presentation to users associated with a location within a threshold distance from San Francisco and not eligible for presentation to users associated with locations greater than threshold distance from San Francisco. A location specified in targeting criteria may be based on the location of a residence associated with a user, a location of a workplace associated with the user, a current location of the user (e.g., a location determined by a global positioning system GPS receiver of a mobile device of the user), or any other suitable location associated with a user.

The ad auction store 233 includes information describing previously completed auctions where one or more advertisements were selected. For example, the ad auction store 233 includes information identifying a user for which a previously completed auction selected an advertisement, the advertisement selected from the previously completed auction, a bid amount associated with the selected advertisement, an amount charged to an advertiser associated with the selected advertisement, and a context scalar describing a context in which the selected advertisement was presented based on an advertisement auction (e.g., based on the user, based on a location of ad placement, based on a type of computing device used to view the ad, and the like). In various embodiments, additional information describing an ad auction may also be stored, such as targeting criteria associated with the selected advertisement.

The ad auction module 235 retrieves advertisement requests from one or more advertising campaigns and ranks the received advertisements based on their bid amounts when an opportunity to present an advertisement to a user is identified. For example, the ad auction module 235 ranks the received advertisement requests based on their associated expected values, which are based at least in part on the advertisement requests' bid amounts, where advertisement requests associated with larger expected values have a higher position in the ranking. The ad auction module 235 selects one or more advertisements from advertisement requests based on the ranking, with the selected advertisements are presented to a social networking system user. For example, the ad auction module 235 selects advertisements from advertisement requests having the highest positions in the ranking or having at least a threshold position in the ranking. In other embodiments, the auction module 235 may use any other suitable method to select advertisements for presentation to a social networking system user.

The reach estimation module 240 estimates the number of distinct users associated with locations within a certain geographic region within a given time period. The reach estimation module 240 may be used to estimate the number of users that would be able to reach by an ad campaign that is targeted to users located in a specific geographic area. In the example of FIG. 2, the reach estimation module 240 includes a user sampling module 250, a location store 255, a geo-tile user counting module 260, and a sampling rate determination module 265. However, in other embodiments, the reach estimation module 240 may include different and/or additional components than those described in conjunction with FIG. 2.

The user location sampling module 250 associates a location with a user of the social networking system. In one embodiment, an association between the location and the user is stored in the location store 255. As illustrated in FIG.

3, the location store 255 includes information identifying a user, information identifying a location associated with the user, and a time stamp indicating when the location was associated with the user. For example, the location store 255 includes a user identifier, information identifying a location associated with the user identifier, and a time stamp indicating the date and/or time at which the location was obtained for the user corresponding to the user identifier. In one embodiment, the user location sampling module 250 stores a latitude and longitude of a location of the user in the location store 255.

Alternatively, the user location sampling module 250 divides a geographic region into a plurality of geo-tiles that each correspond to a geographic area in the geographic region and stores a geo-tile identification (geo-tile ID) of the location of the user, which identifies a geo-tile including a location associated with the user in the location store 255. Each location included in a specific geo-tile is assigned to a geo-tile ID associated with the geo-tile. Hence, different geographic locations included in a geographic area corresponding to a geo-tile are associated with a common geo-tile ID associated with the geo-tile. In some embodiments, a geo-tile ID is determined based on a halving algorithm that reduces the area of a geo-tile by a factor of 2 (or a power of 2, such as 4) each time the level of precision of the geo-tile ID algorithm is increased; when the geo-tile ID algorithm precision is increased, each geo-tile corresponds to a smaller geographic area, allowing a specific geo-tile to more specifically identify locations. In other embodiments, the halving algorithm reduces the latitude and/or longitude range of a geo-tile by a factor of 2 (or a power of 2) each time the level of precision of the geo-tile ID in increased so each geo-tile corresponds to a smaller geographic area.

In some embodiments, a level of precision of the geo-tile ID algorithm is represented by the number of digits or characters of the geo-tile ID. That is, a geo-tile ID with a level of precision of 15 has 15 digits or characters. In some embodiments, each digit of a geo-tile ID is a binary digit, so the geo-tile ID is a binary value. In these embodiments, when the level of precision of the geo-tile ID algorithm is increased by one (i.e., an additional digit is included in the geo-tile ID), the latitude or longitude range included in a geo-tile is reduced by a factor of 2 depending on whether the digit is in an odd position or an even position. In another embodiment, the digits of a geo-tile ID are hexadecimal digits. In this embodiment, when the level of precision of the geo-tile ID algorithm is increased by one (i.e., an additional digit is included in the geo-tile ID), the latitude and longitude range of locations included in a geo-tile are each reduced by a factor of 4.

Alternatively, the level of precision of a geo-tile ID value is a fraction of the number of digits or characters comprising the geo-tile ID value. Thus, multiple digits are added to a geo-tile ID value to increase the level of precision of the geo-tile ID. For example, to increase the level of precision of a geo-tile ID by one, two binary digits are appended to the geo-tile ID value.

A geo-tile at a lower level of precision includes multiple geo-tiles at higher levels of precision. To identify a geo-tile having a lower-level of precision that includes a geo-tile, one or more least-significant digits or characters may be removed from a geo-tile ID to identify a geo-tile ID of the less precise geo-tile. For example, if a geo-tile ID has a level of precision of 15, removing the least-significant digit of the geo-tile ID yields the geo-tile ID corresponding to a geo-tile having a level of precision of 14 that includes the geo-tile corresponding toe the geo-tile ID having the level of precision of 15. As a specific example, if a geo-tile ID for a user location is 1011001110101010, a geo-tile ID of a geo-tile including the geo-tile corresponding to the geo-tile ID of 1011001110101010 is 10110011101010. In other embodiments, other algorithms may be used to generate the geo-tile IDs. Example methods for dividing a geographic region into a plurality of geo-tiles and generating geo-tile IDs for the plurality of geo-tiles are further described in U.S. patent application Ser. No. 13/685,246, filed Nov. 26, 2012, and titled "Search Results Using Density-Based Map Tiles;" and U.S. patent application Ser. No. 14/220,493, filed Mar. 20, 2014, and titled "Polygon-Based Indexing of Places," both of which are hereby incorporated by reference in their entirety.

Referring back to FIG. 2 and FIG. 3, in various embodiments, the user location sampling module 250 stores a single location associated with each user in the location store 255 based on privacy settings enforced by the social networking system 140 and periodically updates the location associated with a user. In some embodiments, the user location sampling module 250 updates the location of a user within a specified time interval. To reduce the number of times the location associated with a user is updated, the user location sampling module 250 does not update the location associated each time a new location associated with the user is received by the social networking system 140. When a new location associated with a user is a received by the social networking system 140 (e.g., received from a client device 110 associated with the user), the user location sampling module 250 determines whether to update the location associated with the user. Whether to update the location associated with the user is based at least in part on the number of times a location associated with the user has been received in the specified time interval (e.g., the number of times location associated with the user is received within a 7 day period of time). For example, each time a location associated with the user is received, the user location sampling module 250 determines whether to update the location of the user with a probability of 1/n, where n is the average number of times a location associated with the user is received during a specified time interval (e.g., received within 7 days). The average number of times a location associated with the user is received is determined based on historical data associated with the user. For example, the average number of times a location associated with the user is received may be determined based on the number of times a location associated with the user was received during a time period, such as 30 days.

If each time a location associated with the user is received, the user location sampling module determines whether to update the location with a probability of 1/n, so after n locations associated with a user are received, the probability that the location associated with the user is not updated, ($P_{no\_update}$), is:

$$P_{no\_update} = \left(\frac{n-1}{n}\right)^n \tag{1}$$

For example, if n is 2, the probability that the location of the user will not be updated after n locations are received is ¼ or 25%. In another example, if n is 3, the probability that the location of the user will not be updated after n locations are received is $(2/3)^3$ or 29.6%. Hence, as n increases, the probability that the location is not updated also increases.

Furthermore, as n increases, the probability that the location associated with the user is not updated approaches 1/e≈36.8%. That is:

$$\lim_{n \to \infty} P_{no\_update} = \lim_{n \to \infty} \left( \frac{n-1}{n} \right)^n = \frac{1}{e} \quad (2)$$

Figures 3, 4:
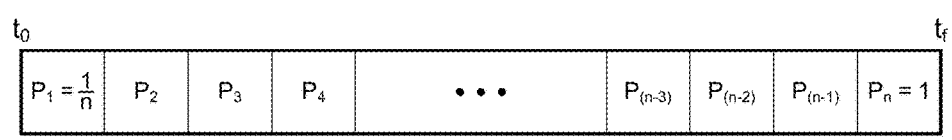
FIG. 3 is a table illustrating association between users and geographic locations, in accordance with an embodiment.
FIG. 4 illustrates a process for increasing a probability of updating a location associated with a user, in accordance with an embodiment.

To increase the probability that the location associated with a user is updated within the specified time interval, the probability used to determine whether to update the location associated with the user may increase based on a number of times a location associated with the user was received since a most recent update of the location associated with the user, and/or the amount of time that has elapsed between a current time and a most recent update of the location associated with the user. FIG. 4 is a process flow diagram illustrating one method for increasing a probability of updating the location associated with a user. As illustrated in FIG. 4, after updating a location associated with a user, the probability used by the user location sampling module 250 to determine whether to update the location associated with the user is 1/n. Additionally, after receiving n locations associated with the user, the probability used by the user location sampling module 250 to determine whether to update the location associated with the user is 1. In some embodiments, the probability used by the user location sampling module 250 is:

$$P_t = \left( \frac{1}{n-t+1} \right) \quad (3)$$

where n is the average number of times a location associated with a user is received within a specified time interval, t is a number of times a location associated with the user was received after the location associated with the user was most recently updated. When t is 1 (i.e., the first location associated with a user received after the location associated with the user was updated), the probability $P_1$ is 1/n. When t is n (i.e., the n-th location associated with the user received after the location of the user was updated), the probability $P_n$ is equal to 1.

Referring back to FIG. 2, the geo-tile user counting module 260 determines a number of distinct users associated with locations within in a geo-tile during a specified time period (e.g., within the past 7 days). To determine the number of distinct users associated with a location within a geo-tile, the geo-tile user counting module 260 stores information related to locations associated with various users and received form client devices 110 associated with the various users in the location store 255. To protect the privacy of social networking system users, the geo-tile user counting module 260 stores a hash value (e.g., a cryptographic hash function such as the secure hash algorithm (SHA), or the message-digest algorithm (MD5)) of a string based at least in part on a location associated with a user and information identifying the user. FIG. 5 shows an example of information stored by the geo-tile user counting module 260 in the location store 255. In the example of FIG. 5, the geo-tile user counting module 260 stores a time stamp 501 of when a location associated with a user was received, information identifying the received location 503, and cryptographic hash value 505 of a string based at least in part on a location of a user and information identifying the user.

The geo-tile user counting module 260 stores multiple entries, each entry having a different level of precision of the information identifying a received location associated with a user. For example, the geo-tile user counting module 260 stores multiple entries each having a different level of precision of the geo-tile ID algorithm that generates a geo-tile identification (geo-tile ID) including a received location associated with a user. The example table of FIG. 5 includes entries for a first location included in geo-tile 12345678 for user1, entries for a second location included in geo-tile 12345679 for user2, and entries for a third location included in geo-tile 12345688 for user1. In the example of FIG. 5, the geo-tile user counting module 260 stores entries at four levels of precision. Hence, for the first location included in geo-tile 12345678, the geo-tile user counting module 260 stores a first entry 510A associated with geo-tile 12345678, a second entry 510B associated with geo-tile 1234567, which is a geo-tile having a lower level of precision than geo-tile 12345678 and including geo-tile 12345678, a third entry 510C associated with geo-tile 123456, which includes geo-tile 1234567, and a fourth entry 510D associated with the geo-tile 12345, which includes geo-tile 123456. Similarly, entries 520A-520D identify a location associated with geo-tile 12345679 for user2 at different levels of precision, while entries 530A-530D identify a location associated with geo-tile 12345688 for user1 at different levels of precision.

In some embodiments, the geo-tile user counting module 260 determines whether a hash value 505 for a received location associated with a user is already stored in the location store 255. If the hash value 505 is already stored in the location store 255, the geo-tile user counting module 260 updates the time stamp of the stored entry in the location store 255 with the time stamp of the received location. Referring to FIG. 5, in this embodiment, since entries 510C and 530C have the same hash value and entries 510D and 530D have the same hash value 505, instead of storing new entries for entries 530C and 530D, the geo-tile user counting module 260 updates entries 510C and 510D with a time stamp corresponding to a time when information identifying the locations corresponding to hash values 505 included in entries 530C and 530D was received.

To determine a number of users associated with a location included in a geographic area corresponding to a geo-tile, the geo-tile user counting module 260 determines a number of different hash values 505 associated with the geo-tile. For example, the geo-tile user counting module 260 determines a number of entries in the location store 255 that are associated with the specific geo-tile and associated with distinct hash values 505. As information identifying the user is hashed in combination with information identifying the location of the user using a cryptographic hashing function to determine a hash value 505, the social networking system 140 is unable to determine prior locations associated with a user based on information identifying the user. At most, given a location and information identifying a user, the social networking system 140 may determine whether a previously-received location associated with the user was included in a geo-tile associated with the given location.

Referring back to FIG. 2, the sampling rate determination module 265 determines a rate at which the user location sampling module 250 samples user locations for a specific geo-tile. For a specific geo-tile, the sampling rate determination module 265 determines a ratio between a number of users associated with a location included in the geo-tile by the user location sampling module 250 and a number of distinct users associated with locations included in the geo-tile determined by the geo-tile user counting module 260. For example, a number of users with stored locations located inside the geo-tile is divided by a number of unique hash values associated with locations included in the geo-tile. Additionally, the sampling rate determination module 265 may also determine an average sampling rate for multiple geo-tiles based on sampling rates associated with each geo-tile. For example, geo-tiles included in a geographic region are identified, and an average sampling rate for the geographic region is determined based on sampling rates of each of the identified geo-tiles.

The web server 270 links the social networking system 140 via the network 120 to the one or more client devices 110, as well as to the one or more third party systems 130. The web server 270 serves web pages, as well as other content, such as JAVA®, FLASH®, XML and so forth. The web server 270 may receive and route messages between the social networking system 140 and the client device 110, for example, instant messages, queued messages (e.g., email), text messages, short message service (SMS) messages, or messages sent using any other suitable messaging technique. A user may send a request to the web server 270 to upload information (e.g., images or videos) that are stored in the content store 210. Additionally, the web server 270 may provide application programming interface (API) functionality to send data directly to native client device operating systems, such as IOS®, ANDROID™, WEBOS® or BlackberryOS.

Reach Estimation

Figure 6:
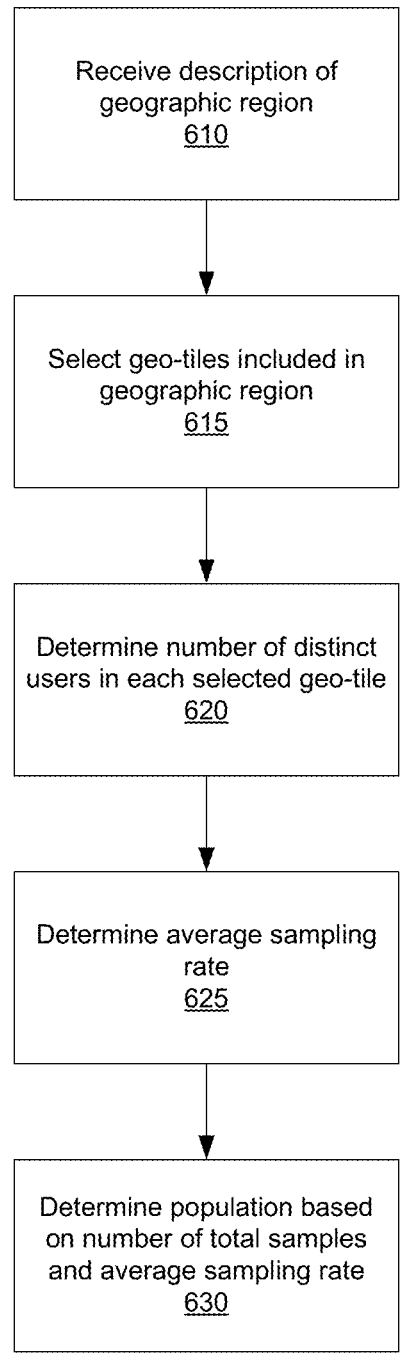
FIG. 6 is a flowchart of a process for estimating a number of users associated with locations within a geographic region, in accordance with an embodiment.

FIG. 6 illustrates a flow diagram of a process for estimating a number of users associated with locations within a geographic region. For example, the geographic region is a circular area having a center at a location and a radius specified by the user. In other embodiments, the process may include different and/or additional steps than those described in conjunction with FIG. 6 or may perform steps in different orders than the order described in conjunction with FIG. 6.

The reach estimation module 240 receives 610 a description of a geographic region. For example, the reach estimation module 240 receives a location and selects a radius 610 of circular geographic region having a center at the received location. In some embodiments, the reach estimation module 240 selects various radii to define different circular geographic regions and repeats the process described in conjunction with FIG. 6 for different radii.

Figure 7:
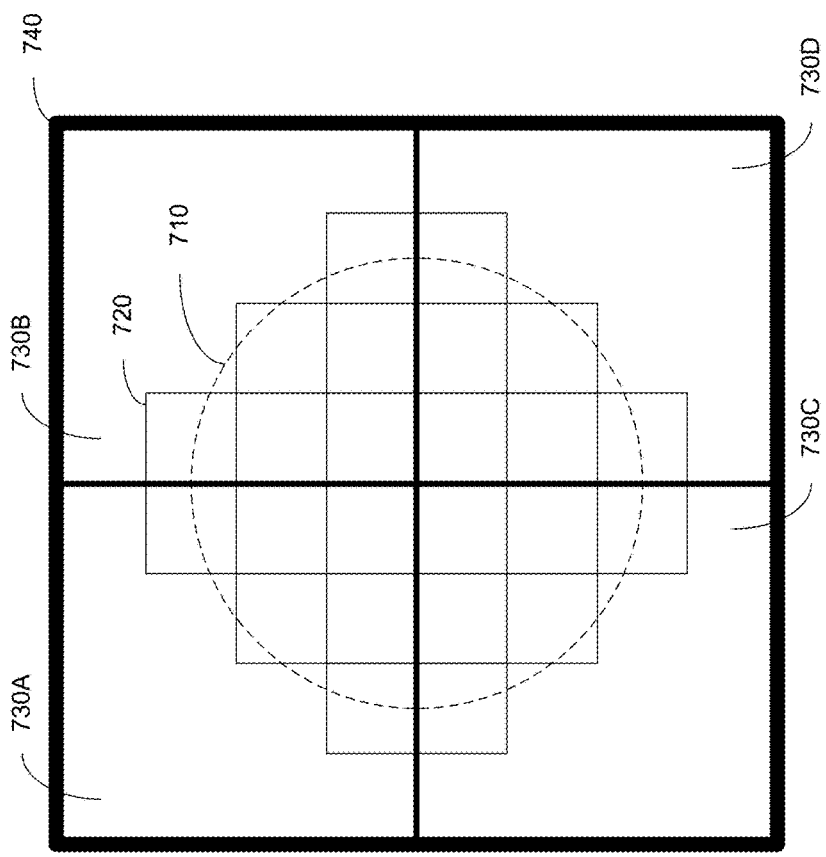
FIG. 7 illustrates a geographic region and use of geo-tiles to estimate a number of distinct social networking system users associated with a location within the geographic region, in accordance with an embodiment.
Figure 8:
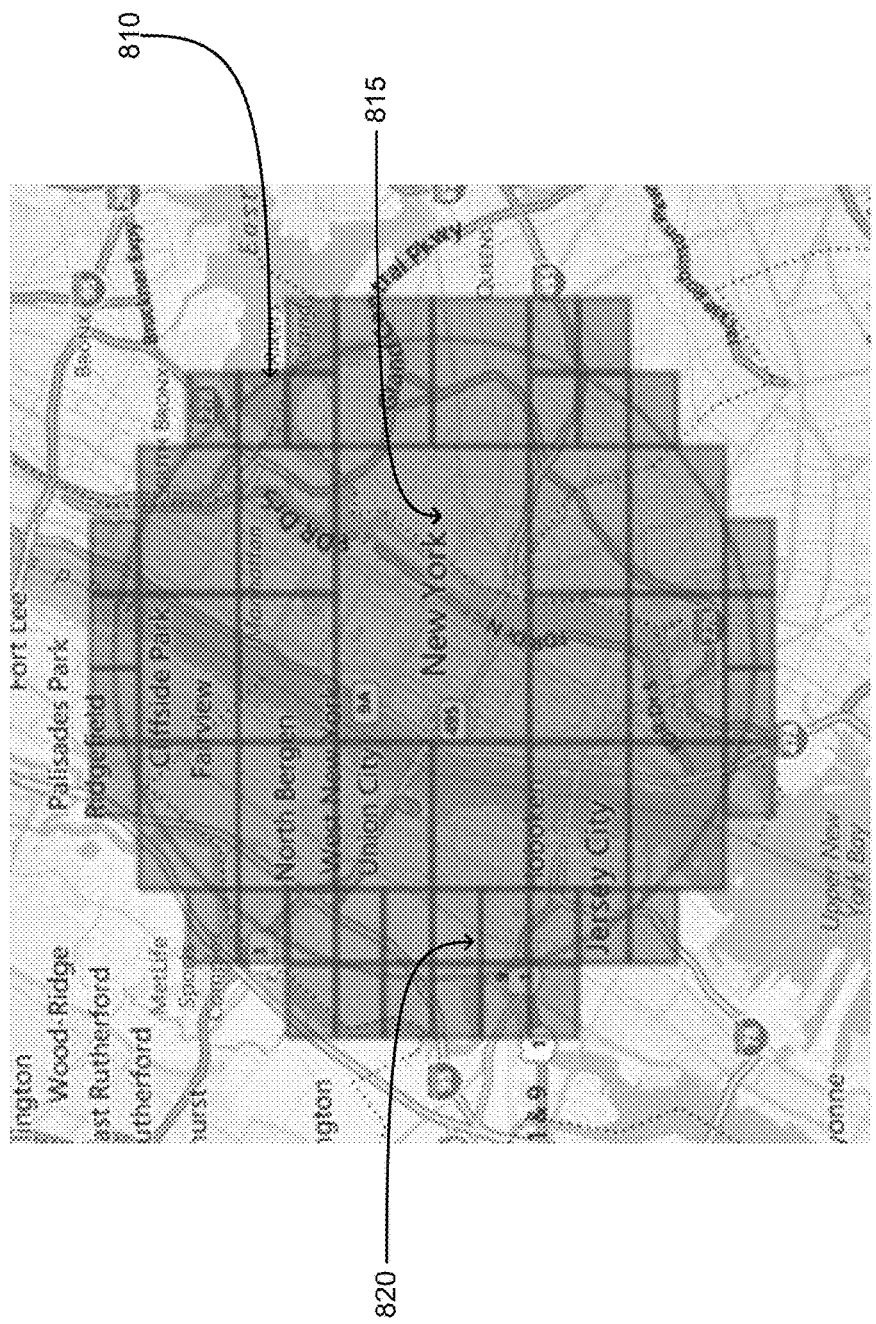
FIG. 8 illustrates a map of a geographic region and use of geo-tiles with multiple levels of resolution to estimate a number of distinct social networking system users associated with locations within the geographic region, in accordance with an embodiment.

Referring to FIG. 7, an example geographic region comprising a circle 710 with a selected radius is shown. The reach estimation module 240 selects 615 geo-tiles 720 included in the geographic region. For example, the reach estimation module 240 selects 615 geo-tiles based on a radius associated with the specified geographic region. In one embodiment, a set of geo-tiles that approximate the circle 710 with the selected radius is selected 615. For example, geo-tiles having at least a threshold area within the circle 710 are selected 615. In some embodiments, the geo-tiles 720 included in the selected set of geo-tiles have the highest level of precision used by the reach estimation module 240. To select 615 geo-tiles, the reach estimation module 240 selects 615 geo-tiles having the highest level of precision that overlap with the specified geographic region. Alternatively, geo-tiles having at least a threshold amount of overlap with the specified geographic region are selected 615. In some embodiments, if all geo-tiles having a higher level of precision are included in the specified geographic region, a geo-tile having a lower level of precision and including the geo-tiles having the higher level of precision is selected 615 instead of the more precise geo-tiles. In the example of FIG. 8, a geo-tile having a lower level of precision 815 includes multiple geo-tiles having a higher level of precision 820 that are each included in a geographic region 810, so the geo-tile having the lower level of precision 815 is selected 615, as well as geo-tiles having the higher level of precision 820 that are included in the geographic area 810 (or geo-tiles having the higher level of precision 820 that have at least a threshold area within the geographic area 810). Hence, in some embodiments, such as the example of FIG. 8, the selected set of geo-tiles that approximate a geographic area includes geo-tiles having different levels of precision.

The user location sampling module 250 determines 620 the number of distinct users associated with locations included in each of the selected geo-tiles 720. For each selected geo-tile, the user location sampling module 250 determines users associated with a location included in a selected geo-tile 720. For example, the geo-tile user location sampling module 250 identifies users from the location store 255 associated with location identification information corresponding to a selected geo-tile 720. Referring to FIG. 3, the geo-tile user location sampling module 250 identifies information from the location store having location identification information specifying a selected geo-tile 720. In some embodiments, users associated with a location included in a selected geo-tile and having characteristics satisfying one or more targeting criteria are identified. For example, if a user specifies targeting criteria associated with the geographic region (e.g., targeting criteria of an advertisement request for presentation to users included in the geographic region) that identifies users between 21 and 30 years old, the user location sampling module 250 determines 620 the number of distinct users associated with locations included in each of the selected geo-tiles 720 and having an age between 21 and 30.

Additionally, the sampling rate determination module 265 determines 625 an average sampling rate based on the selected geo-tiles 720. For a specific geo-tile, the sampling rate determination module 265 determines a ratio between a number of users associated with a location included in the geo-tile by the user location sampling module 250 and a number of distinct users associated with locations included in the geo-tile determined by the geo-tile user counting module 260. For example, a number of users with stored locations located inside the geo-tile is divided by a number of unique hash values associated with locations included in the geo-tile to determine the sampling rate for the geo-tile. In one embodiment, the sampling rate determination module 265 determines an arithmetic mean of the sampling rates of each of the selected geo-tiles 720 to determine 625 the average sampling rate. Alternatively, the average sampling rate is determined 625 as a weighted arithmetic mean of sampling rates for selected geo-tiles 720. For example, sampling rates of different selected geo-tiles 720 are weighted by a percentage of the different geo-tiles that is included in the geographic region. Alternatively, sampling rates associated with different selected geo-tiles 720 are weighted based on a number of users associated with locations included in each of the selected geo-tiles 720. In some embodiments, sampling rates may be determined for multiple subsets of the selected geo-tiles 720, and the sampling rate determination module 265 determines the average sampling rate based on the sampling rates determined for the multiple subsets of the selected geo-tiles 720. For example, the average sampling rate is an average of the sampling rates determined for the multiple subsets of the selected geo-tiles 720.

Alternatively, a sampling rate may be determined 625 based on geo-tiles with lower resolution than the resolution of the selected geo-tiles 720. For example, based on the number of geo-tiles 720 that approximate the geographic region, such as the circle 710 in FIG. 7, a geo-tile resolution is determined. For instance, the geo-tile resolution is determined based on a logarithmic value of the number of geo-tiles that approximate the geographic region. In some embodiments, two geo-tile resolutions ($res_1$ and $res_2$) are determined based on the logarithmic value of the number of geo-tiles approximating the geographic region:

$$res_1 = res_{high} - \text{floor}(res) \quad (4)$$

$$res_2 = res_{high} - \text{ceil}(res) \quad (5)$$

where $$res = \log_4(num\_small\_tiles) \quad (6)$$

where num_small_tiles is the number of geo-tiles 720 that approximate circle 710. In some embodiments, the number of geo-tiles 720 that approximate the circle 710 is determined as:

$$num\_small\_tiles = \sum_{k=1}^{n} 4^{res_{high} - res_k} \quad (7)$$

In the example of FIG. 7, 24 selected geo-tiles 720 approximate circle 710. That is:

$$res_1 = res_{high} - \text{floor}(\log_4(24)) = res_{high} - \text{floor}(2.29)$$
$$= res_{high} - 2$$

$$res_2 = res_{high} - \text{ceil}(\log_4(24)) = res_{high} - \text{ceil}(2.29)$$
$$= res_{high} - 3$$

For instance, if $res_{high}$ is 15, $res_1$ is equal to 13 and $res_2$ is equal to 12.

Geo-tiles having the determined resolution that have at least a threshold amount of overlap with at least one of the selected geo-tiles 720 in the set of geo-tiles having the highest level of precision ($res_{high}$) are selected. As shown in FIG. 7, geo-tiles 730A, 730B, 730C and 730D having level of precision ($res_1$) 2 levels lower than the level of precision of the selected geo-tiles 720, and geo-tiles 740 having a level of precision ($res_2$) 3 levels lower than the selected geo-tiles 720 having the highest level of precision are selected.

An average sampling rate (sampling_rate_1) for the geo-tiles 730 having a level of precision $res_1$ and an additional average sampling rate (sampling_rate_2) for the geo-tiles 740 having a level of precision $res_2$ are determined. The sampling rate determination module 265 determines an average of the average sampling rate and the additional average sampling rate. In some embodiments, the average of the average sampling rate and the additional average sampling rate is weighted based on the number selected geo-tiles that approximate the geographic region. For instance, the average of the average sampling rate and the additional average sampling rate is weighted based on the decimal portion of the logarithmic value of the number of geo-tiles 720 that approximate the geographic region. In one embodiment, the average sampling rate is determined as:

$$\begin{aligned}average\_sampling\_rate = &(\text{ceil}(\log_4(num\_small\_tiles)) - \\&\log_4(num\_small\_tiles)) \times sampling\_rate\_1 + (\log_4 \\&(num\_small\_tiles) - \text{floor}(\log_4(num\_small\_tiles))) \times sampling\_rate\_2\end{aligned} \quad (8)$$

Based on the number of distinct users associated with locations included in each of the selected geo-tiles 720 and the average sampling rate, the reach estimation module 240 estimates 630 the number of distinct users associated with locations within the geographic region. For instance, the reach estimation module 240 determines the number of distinct users associated with locations within the geographic region as:

$$total\_users = \frac{sampled\_users}{average\_sampling\_rate} \quad (9)$$

Where sampled_users is the number of distinct users associated with locations included in each of the selected geo-tiles 720 and total_users is the estimated number of users associated with a location within the geographic region.

The number of distinct users may be determined by the social networking system 140 when a request is received from an advertiser. For example, when providing an advertisement to the social networking system 140 for presentation to users associated with locations within a specified geographic region, the social networking system 140 determines numbers of distinct users associated with locations within different geographic regions and presents the advertiser with the numbers of distinct users, allowing the advertiser to modify the geographic region associated with the advertisement. Alternatively, an advertiser specifies a number of users to be presented with the advertisement, and the social networking system 140 identifies a geographic region including a number of distinct users equaling or exceeding the specified number of users. The social networking system 140 may then specify the geographic region to the user for association with the advertisement.

Summary

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments of the invention is intended to be illustrative, but not limiting, of the scope of the patent rights, which is set forth in the following claims.

What is claimed is:

1. A method comprising:
    receiving information describing locations of a plurality of users;
    updating locations associated with each of the plurality of users based on the received information;
    generating cryptographic hash values for each of the plurality of users, a hash value for a user based at least in part on received information describing a location of the user and information identifying the user;
    storing the generated hash values and an association between the generated hash value and a corresponding location;
    identifying a geographic region including a set of geo-tiles, each geo-tile identifying a portion of the geographic region;
    determining a set of distinct users based at least in part on the generated hash values, each distinct user having a location within a geo-tile included in the identified geographic region;
    determining an average sampling rate for the set of geo-tiles based at least in part on a number of hash values associated with locations within each of the geo-tiles in the set of geo-tiles and a number of distinct users associated with locations within each of the geo-tiles in the set of geo-tiles; and
    determining an estimated number of users associated with locations within the identified geographic region based on a number of users in the set of distinct users and the determined average sampling rate for the set of geo-tiles.

2. The method of claim 1, wherein determining the average sampling rate for the set of geo-tiles comprises:
    determining a sampling rate for each a plurality of subsets of geo-tiles of the set of geo-tiles included in the geographic region; and
    determining the average sampling rate for the set of geo-tiles based on the sampling rates for each of the plurality of subsets of geo-tiles.

3. The method of claim 1, wherein determining the average sampling rate for the set of geo-tiles comprises:
    determining a number of geo-tiles in the set of geo-tiles included in the geographic region;
    determining a geo-tile resolution based on the determined number of geo-tiles in the set of geo-tiles;
    determining a set of geo-tiles having the determined geo-tile resolution and including the geo-tiles in the set of geo-tiles included in the geographic region; and
    determining an average sampling rate for the set of geo-tiles having the determined geo-tile resolution and including the geo-tiles in the set of geo-tiles included in the geographic region.

4. The method of claim 3, wherein determining the average sampling rate for the set of geo-tiles further comprises:
    determining an additional geo-tile resolution based on the determined number of geo-tiles in the set of geo-tiles;
    determining an additional set of geo-tiles having the additional determined geo-tile resolution and including the geo-tiles in the set of geo-tiles included in the geographic region;
    determining an additional average sampling rate for the additional set of geo-tiles having the additional determined geo-tile resolution and including the geo-tiles in the set of geo-tiles included in the geographic region; and
    determining the average sampling rate based on the average sampling rate for the set of geo-tiles having the determined geo-tile resolution and including the geo-tiles in the set of geo-tiles included in the geographic region and the additional average sampling rate for the additional set of geo-tiles having the additional determined geo-tile resolution and including the geo-tiles in the set of geo-tiles included in the geographic region.

5. The method of claim 4, wherein determining the average sampling rate based on the average sampling rate for the set of geo-tiles having the determined geo-tile resolution and including the geo-tiles in the set of geo-tiles included in the geographic region and the additional average sampling rate for the additional set of geo-tiles having the additional determined geo-tile resolution and including the geo-tiles in the set of geo-tiles included in the geographic region comprises:
    associating weights with the average sampling rate for the set of geo-tiles having the determined geo-tile resolution and including the geo-tiles in the set of geo-tiles included in the geographic region and the additional average sampling rate for the additional set of geo-tiles having the additional determined geo-tile resolution and including the geo-tiles in the set of geo-tiles included in the geographic region based at least in part on the number of geo-tiles in the set of geo-tiles included in the geographic region; and
    determining the average sampling rate based at least in part on the weights.

6. The method of claim 4, wherein determining the geo-tile resolution based on the determined number of geo-tiles in the set of geo-tiles comprises:
    determining a resolution of the geo-tiles in the set of geo-tiles;
    determining a value based on the number of geo-tiles in the set of geo-tiles included in the geographic region; and
    determining the geo-tile resolution based on the resolution of the geo-tile in the set of geo-tiles and the determined value.

7. The method of claim 6, wherein determining the geo-tile resolution based on the resolution of the geo-tile in the set of geo-tiles and the determined value comprises:

determining the geo-tile resolution as a difference between the resolution of the geo-tiles in the set of geo-tiles and the determined value.

8. The method of claim 6, wherein determining the additional geo-tile resolution based on the determined number of geo-tiles in the set of geo-tiles comprises:
   determining an alternative value based on the a number of geo-tiles in the set of geo-tiles included in the geographic region; and
   determining the additional geo-tile resolution based on the resolution of the geo-tile in the set of geo-tiles and the alternative value.

9. The method of claim 8, wherein determining the additional geo-tile resolution based on the resolution of the geo-tiles in the set of geo-tiles and the alternative value comprises:
   determining the additional geo-tile resolution as a difference between the resolution of the geo-tiles in the set of geo-tiles and the alternative value.

10. The method of claim 9, wherein the determined value comprises an integer value less than a logarithm of the number of determined number of geo-tiles in the set of geo-tiles and wherein the alternative value comprises an integer value greater than the logarithm of the number of determined number of geo-tiles in the set of geo-tiles.

11. The method of claim 1, wherein the estimated number of users associated with locations within the identified geographic region is a product of the number of users in the set of distinct users and the determined average sampling rate for the set of geo-tiles.

12. A non-transitory computer-readable storage medium having instructions encoded thereon that, when executed by a processor, cause the processor to:
   receive information describing locations of a plurality of users;
   update locations associated with each of the plurality of users based on the received information;
   generate cryptographic hash values for each of the plurality of users, a hash value for a user based at least in part on received information describing a location of the user and information identifying the user;
   store the generated hash values and an association between the generated hash value and a corresponding location;
   identify a geographic region including a set of geo-tiles, each geo-tile identifying a portion of the geographic region;
   determine a set of distinct users based at least in part on the generated hash values, each distinct user having a location within a geo-tile included in the identified geographic region;
   determine an average sampling rate for the set of geo-tiles based at least in part on a number of hash values associated with locations within each of the geo-tiles in the set of geo-tiles and a number of distinct users associated with a location within each of the geo-tiles in the set of geo-tiles; and
   determine an estimated number of users associated with locations within the identified geographic region based on a number of users in the set of distinct users and the determined average sampling rate for the set of geo-tiles.

13. The non-transitory computer-readable storage medium of claim 12, wherein the estimated number of users associated with locations within the identified geographic region is a product of the number of users in the set of distinct users and the determined average sampling rate for the set of geo-tiles.

14. The non-transitory computer-readable storage medium of claim 12, wherein determine the average sampling rate for the set of geo-tiles comprises:
   determine a number of geo-tiles in the set of geo-tiles included in the geographic region;
   determine a geo-tile resolution based on the determined number of geo-tiles in the set of geo-tiles;
   determine an additional geo-tile resolution based on the determined number of geo-tiles in the set of geo-tiles;
   determine a set of geo-tiles having the determined geo-tile resolution and including the geo-tiles in the set of geo-tiles included in the geographic region;
   determine an additional set of geo-tiles having the additional determined geo-tile resolution and including the geo-tiles in the set of geo-tiles included in the geographic region;
   determine an average sampling rate for the set of geo-tiles having the determined geo-tile resolution and including the geo-tiles in the set of geo-tiles included in the geographic region;
   determine an additional average sampling rate for the additional set of geo-tiles having the additional determined geo-tile resolution and including the geo-tiles in the set of geo-tiles included in the geographic region; and
   determine the average sampling rate based on the average sampling rate for the set of geo-tiles having the determined geo-tile resolution and including the geo-tiles in the set of geo-tiles included in the geographic region and the additional average sampling rate for the additional set of geo-tiles having the additional determined geo-tile resolution and including the geo-tiles in the set of geo-tiles included in the geographic region.

15. The non-transitory computer-readable storage medium of claim 14, wherein determine the average sampling rate based on the average sampling rate for the set of geo-tiles having the determined geo-tile resolution and including the geo-tiles in the set of geo-tiles included in the geographic region and the additional average sampling rate for the additional set of geo-tiles having the additional determined geo-tile resolution and including the geo-tiles in the set of geo-tiles included in the geographic region comprises:
   associate weights with the average sampling rate for the set of geo-tiles having the determined geo-tile resolution and including the geo-tiles in the set of geo-tiles included in the geographic region and the additional average sampling rate for the additional set of geo-tiles having the additional determined geo-tile resolution and including the geo-tiles in the set of geo-tiles included in the geographic region based at least in part on the number of geo-tiles in the set of geo-tiles included in the geographic region; and
   determine the average sampling rate based at least in part on the weights.

\* \* \* \* \*